US012724267B2

(12) United States Patent
Chien et al.

(10) Patent No.: US 12,724,267 B2
(45) Date of Patent: Sep. 1, 2026

(54) DISPLAY DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Yu-Hsiu Chien, New Taipei (TW); Zhen Yin, Shenzhen (CN); Xiao-Xiao Zhang, Shenzhen (CN); Zhuo Wang, Shenzhen (CN); Pan Zhang, Shenzhen (CN)

(73) Assignees: Fu Tai Hua Industry (Shenzhen) Co , Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 464 days.

(21) Appl. No.: 18/218,145

(22) Filed: Jul. 5, 2023

(65) Prior Publication Data

US 2023/0341691 A1 Oct. 26, 2023

(30) Foreign Application Priority Data

Feb. 3, 2023 (CN) ......................... 202320246484.2

(51) Int. Cl.
*G02B 27/01* (2006.01)
*G02C 11/00* (2006.01)

(52) U.S. Cl.
CPC .......... *G02B 27/0172* (2013.01); *G02C 11/10* (2013.01); *G02B 2027/0178* (2013.01); *G02C 2200/20* (2013.01)

(58) Field of Classification Search
CPC ............. F16C 11/06; G02B 2027/0198; G02B 2027/0178; G02B 27/0172; G02B 27/01; G02B 27/0176; G02C 11/10; G02C 2200/20
See application file for complete search history.

(56) References Cited

U.S. PATENT DOCUMENTS 3,843,272 A * 10/1974 Jorn .................... F16C 11/0604 403/132
6,034,653 A * 3/2000 Robertson .......... G02B 27/0176 348/794
6,330,093 B1 * 12/2001 Eller ...................... B64G 1/641 398/79

(Continued)

*Primary Examiner* — Travis S Fissel
(74) *Attorney, Agent, or Firm* — ScienBiziP, P.C.

(57) ABSTRACT

A display device includes an optical assembly for displaying images, a frame, and an adjustment assembly including a spherical bearing a connecting rod, and a cover. The frame and the optical assembly are arranged at intervals, a first recess is concave in a first direction from the frame, a through hole penetrates the frame and communicates with the first recess; a part of the spherical bearing is received in the first recess and abuts against an inner surface defining the first recess; the connecting rod extends through the through hole, one end of the connecting rod is fixed to the spherical bearing, and the other end is connected to the optical assembly; the cover is arranged on a side of the spherical bearing facing away from the frame and adjustably connected to the frame in the first direction to selectively apply or remove a pressure to the spherical bearing.

16 Claims, 8 Drawing Sheets

(56) References Cited

U.S. PATENT DOCUMENTS

| | | | | |
|---|---|---|---|---|
| 6,680,802 | B1 * | 1/2004 | Ichikawa | G02B 27/0172 359/632 |
| 2010/0149073 | A1 * | 6/2010 | Chaum | G02B 27/0075 345/8 |
| 2010/0245757 | A1 * | 9/2010 | Sugihara | G02B 27/0172 351/158 |

* cited by examiner

DISPLAY DEVICE

FIELD

The subject matter herein generally relates to a technical field of optical design, in particular to a display device.

BACKGROUND

With the upgrading of virtual reality (VR) and augmented reality (AR) technologies, virtual reality and augmented reality are welcomed by more and more people for their rich experiences.

Display devices (such as VR glasses/AR glasses) capable of realizing virtual reality and augmented reality display images through an optical assembly. The optical assembly needs to be clearly imaged at a specific imaging angle. However, the imaging angle of the optical assembly may deviate during the process of assembling, moving, or using the display device, which affects the imaging quality.

BRIEF DESCRIPTION OF THE DRAWINGS

Implementations of the present disclosure will now be described, by way of embodiments, with reference to the attached figures.

DETAILED DESCRIPTION

Figure 1:
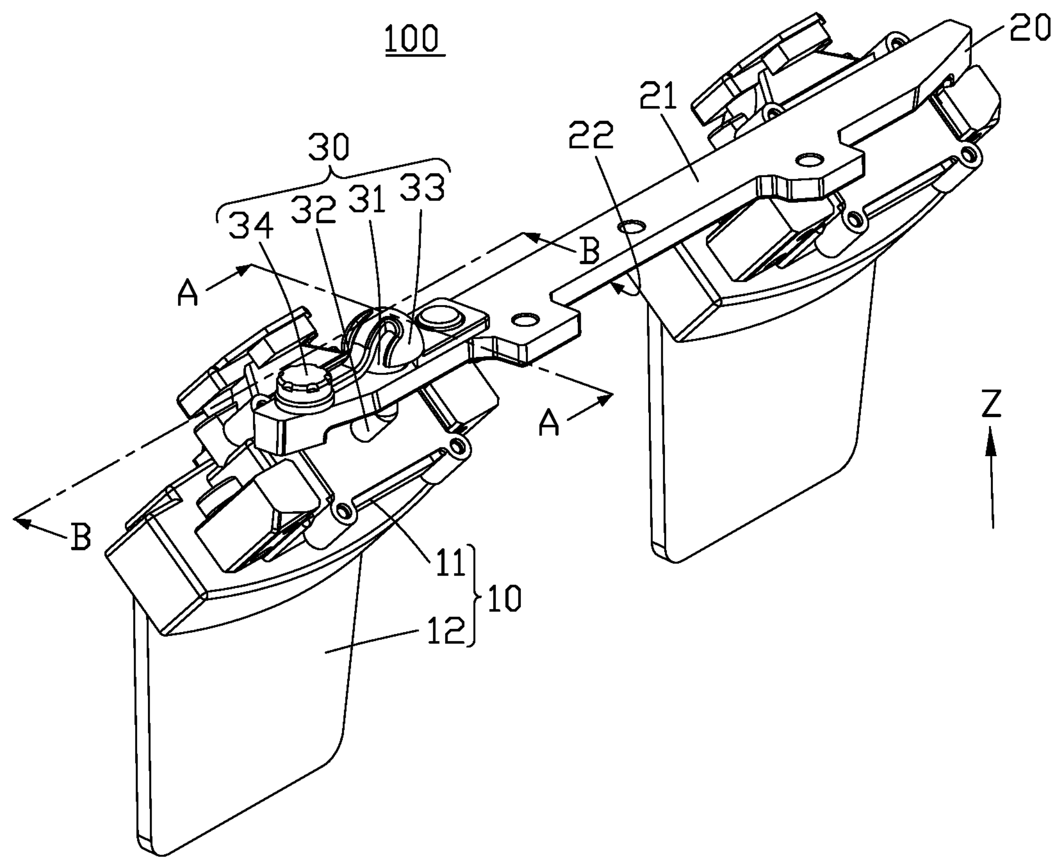
FIG. 1 is a diagram of an embodiment of a display device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

Figure 2:
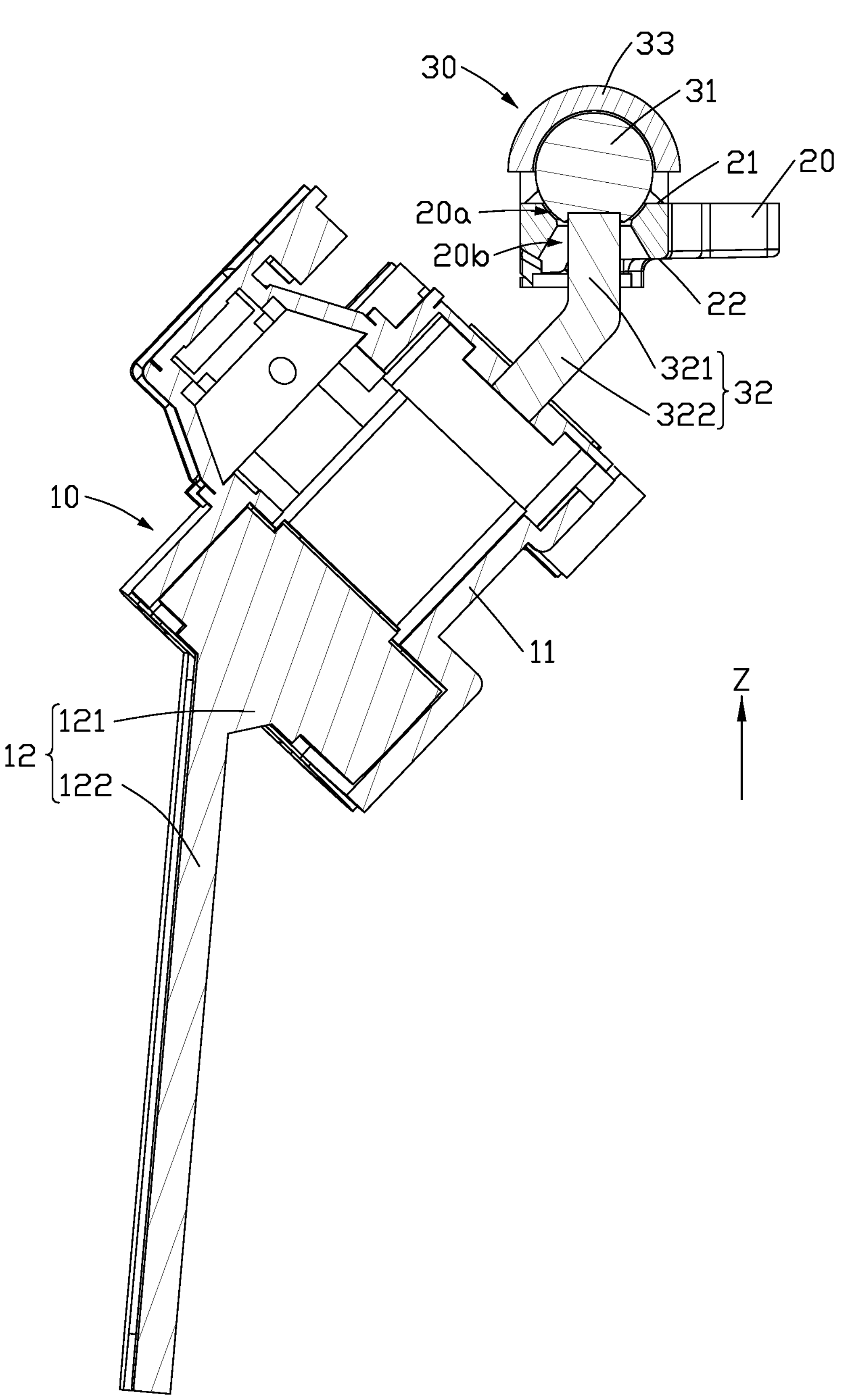
FIG. 2 is a cross-sectional view of an embodiment of the display device along A-A line of FIG. 1.

FIG. 1 illustrates an embodiment of a display device 100. Referring to FIG. 1 and FIG. 2, the display device 100 includes an optical assembly 10, a frame 20, and an adjustment assembly 30. The optical assembly 10 is configured to display images, the images may be, but not limited to AR images or VR images. The frame 20 and the optical assembly 10 are arranged at intervals. A first recess 20*a* is concave in a first direction Z from a side of the frame 20. A through hole 20*b* penetrates the frame 20 and an end of the through hole 20*b* communicates with the first recess 20*a*.

The adjustment assembly 30 includes a spherical bearing 31, a connecting rod 32, and a cover 33. A part of the spherical bearing 31 is received in the first recess 20*a*, and the spherical bearing 31 movably abuts against an inner surface defining the first recess 20*a*. The connecting rod 32 extends through the through hole 20*b*, one end of the connecting rod 32 is fixed to the spherical bearing 31, and the other end of the connecting rod 32 is connected to the optical assembly 10. A position of the spherical bearing 31 in the first recess 20*a* can be adjusted by rolling the spherical bearing 31, so that the connecting rod 32 drives the optical assembly 10 to move in multiple directions with a center of the spherical bearing 31 as a pivot, thereby adjusting an imaging angle of the optical assembly 10 in multiple directions.

The cover 33 is arranged on a side of the spherical bearing 31 facing away from the frame 20 and the cover 33 is adjustably connected to the frame 20 in the first direction Z. The cover 33 may be, but not limited to, adjustable connected to the frame 20 through bolts. The cover 33 can be selectively apply a pressure to the spherical bearing 31. When the cover 33 applies a pressure to the spherical bearing 31, the position of the spherical bearing 31 in the first recess 20*a* is fixed, so that the imaging angle of the optical assembly 10 can be fixed through the connecting rod 32. When the cover 33 removes the pressure applied to the spherical bearing 31, the position of the spherical bearing 31 in the first recess 20*a* can be adjusted, so that the imaging angle of the optical assembly 10 can be adjusted through the connecting rod 32.

Referring to FIG. 1 and FIG. 2, in at least one embodiment, the optical assembly 10 includes a display member 11 and a waveguide sheet 12. One side of the display member 11 is fixedly connected to the connecting rod 32, and another side of the display member 11 is fixedly connected to the waveguide sheet 12. The display member 11 is used to transmit imaging light into the waveguide sheet 12, and the waveguide sheet 12 is used to display images. The imaging angle of the optical assembly 10 is an angle of the waveguide sheet 12 relative to the user.

Specifically, a display is arranged in the display member 11 for generating imaging light, and the display member 11 transmits the imaging light into the waveguide sheet 12. Optionally, the display may be a micro-electro-mechanical system (MEMS), a liquid crystal display (LCD), a light-emitting diode (LED), a organic light-emitting diode (OLED), a digital light processing (DLP), or a liquid crystal on silicon (LCOS).

Referring to FIG. 2, the waveguide sheet 12 includes a first region 121 and a second region 122. The first region 121 is received in the display member 11 for receiving the imaging light of the display member 11. The second region 122 is located outside the display member 11 for displaying images. Optionally, the waveguide sheet 12 may be a grating optical waveguide or a geometric array optical waveguide.

In at least one embodiment, the frame 20 may be roughly in a shape of a strip. The frame 20 includes a first surface 21 and a second surface 22 facing away from each other in the first direction Z. The first recess 20*a* is recessed inward from the first surface 21. The through hole 20*b* communicates the first recess 20*a* and the second surface 22 along the first direction Z. The frame 20 further includes a side surface 23 connecting the first surface 21 and the second surface 22. The first recess 20*a* and the through hole 20*b* are spaced apart from the side surface 23, respectively.

Figure 3:
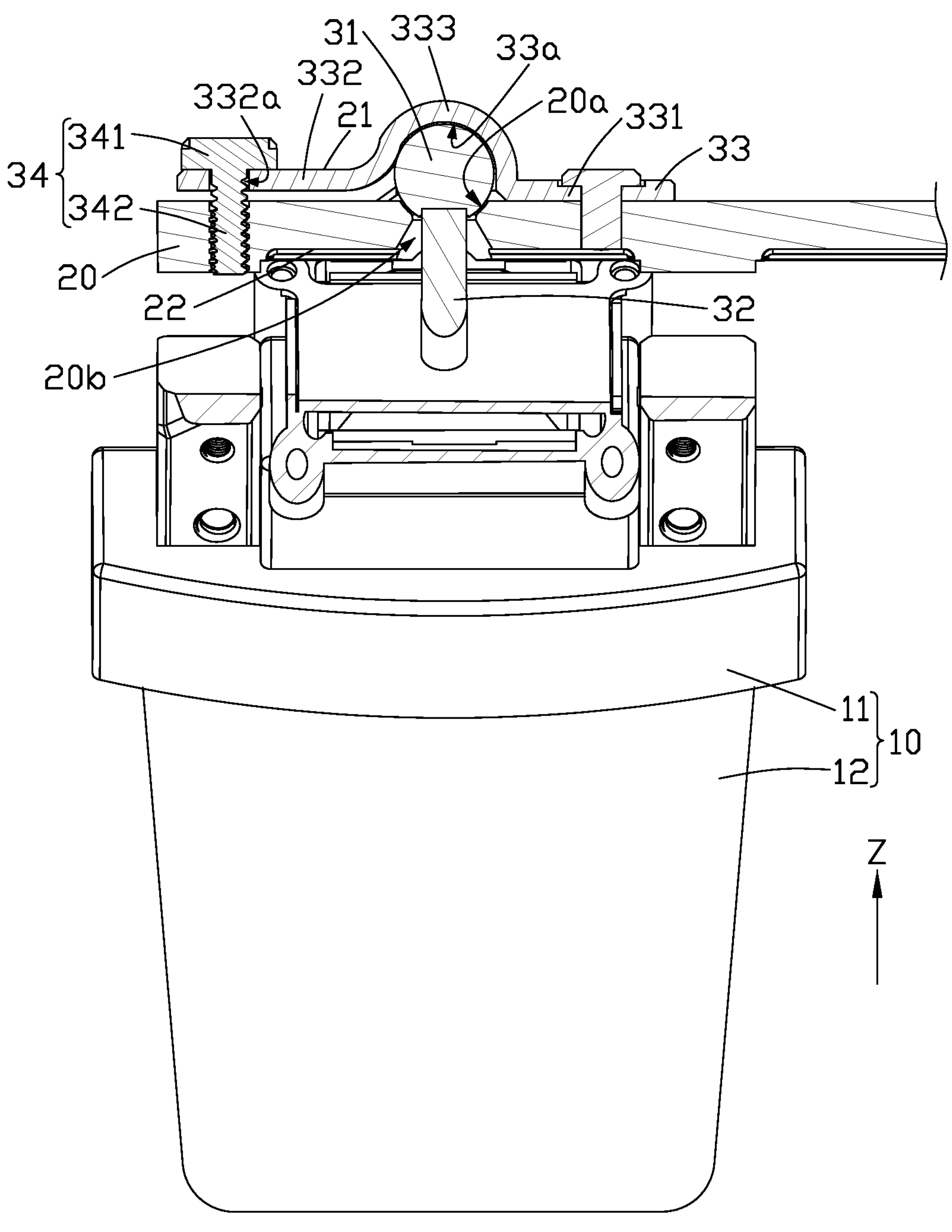
FIG. 3 is a cross-sectional view of an embodiment of the display device along B-B line of FIG. 1.

Referring to FIG. 2 and FIG. 3, in at least one embodiment, a contour of the inner surface defining the first recess 20*a* may correspond with a contour of the outer surface of the spherical bearing 31 to increase a contacting area between the inner surface defining the first recess 20*a* and the spherical bearing 31, thereby improving a stability of fixing the spherical bearing 31 in the first recess 20*a* when the cover 33 applies a pressure to the spherical bearing 31, and improving a stability of rolling the spherical bearing 31 in the first recess 20*a* when the cover 33 removes the pressure applied to the spherical bearing 31. Specifically, the inner surface defining the first recess 20*a* may be an arc-shaped surface so as to fit the outer surface of the spherical bearing 31.

In at least one embodiment, in the first direction Z, a diameter of the through hole 20*b* gradually increases outward from the first recess 20*a*, that is, a constricted end of the through hole 20*b* communicates with the first recess 20*a*, and a flared end of the through hole 20*b* facing away from the constricted end of the through hole 20*b* communicates with the second surface 22. When the position of the spherical bearing 31 in the first recess 20*a* is adjusted by rolling the spherical bearing 31, a movable range of a portion of the connecting rod 32 away from the spherical bearing 31 is greater than a movable range of a portion of the connecting rod 32 adjacent to the spherical bearing 31, which can reduce a risk of an inner surface defining the through hole 20*b* interfering with the connecting rod 32, thereby increasing a range of adjustably positions of the optical assembly 10.

Figure 6:
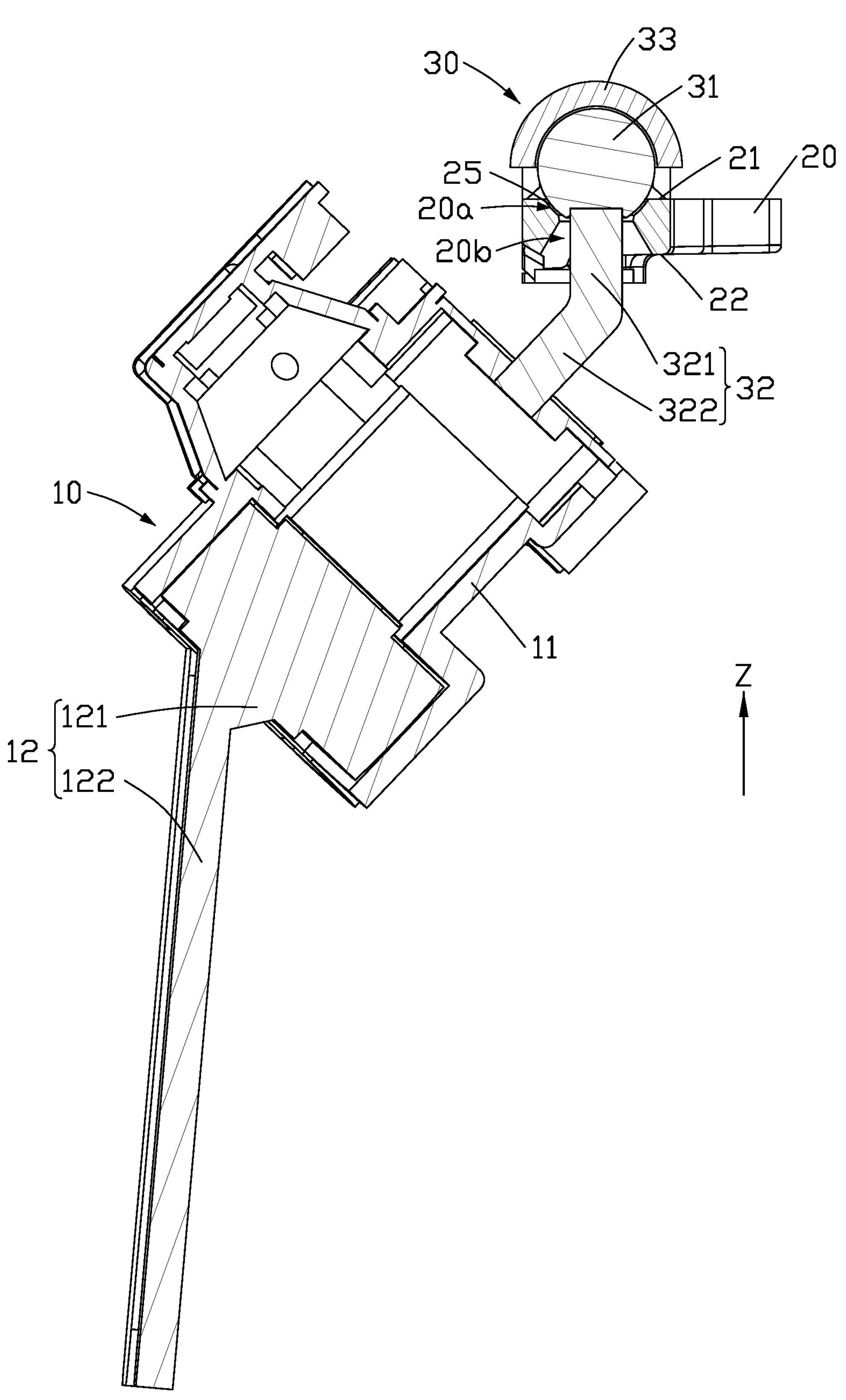
FIG. 6 is a cross-sectional view of another embodiment of the display device along A-A line of FIG. 1.

In at least one embodiment, a friction layer 25 (shown in FIG. 6) may be formed on the inner surface defining the first recess 20*a* to improve a friction between the spherical bearing 31 and the inner surface defining the first recess 20*a*, thereby improving the stability of fixing the spherical bearing 31 in the first recess 20*a* when the cover 33 applies the pressure to the spherical bearing 31.

Figure 4:
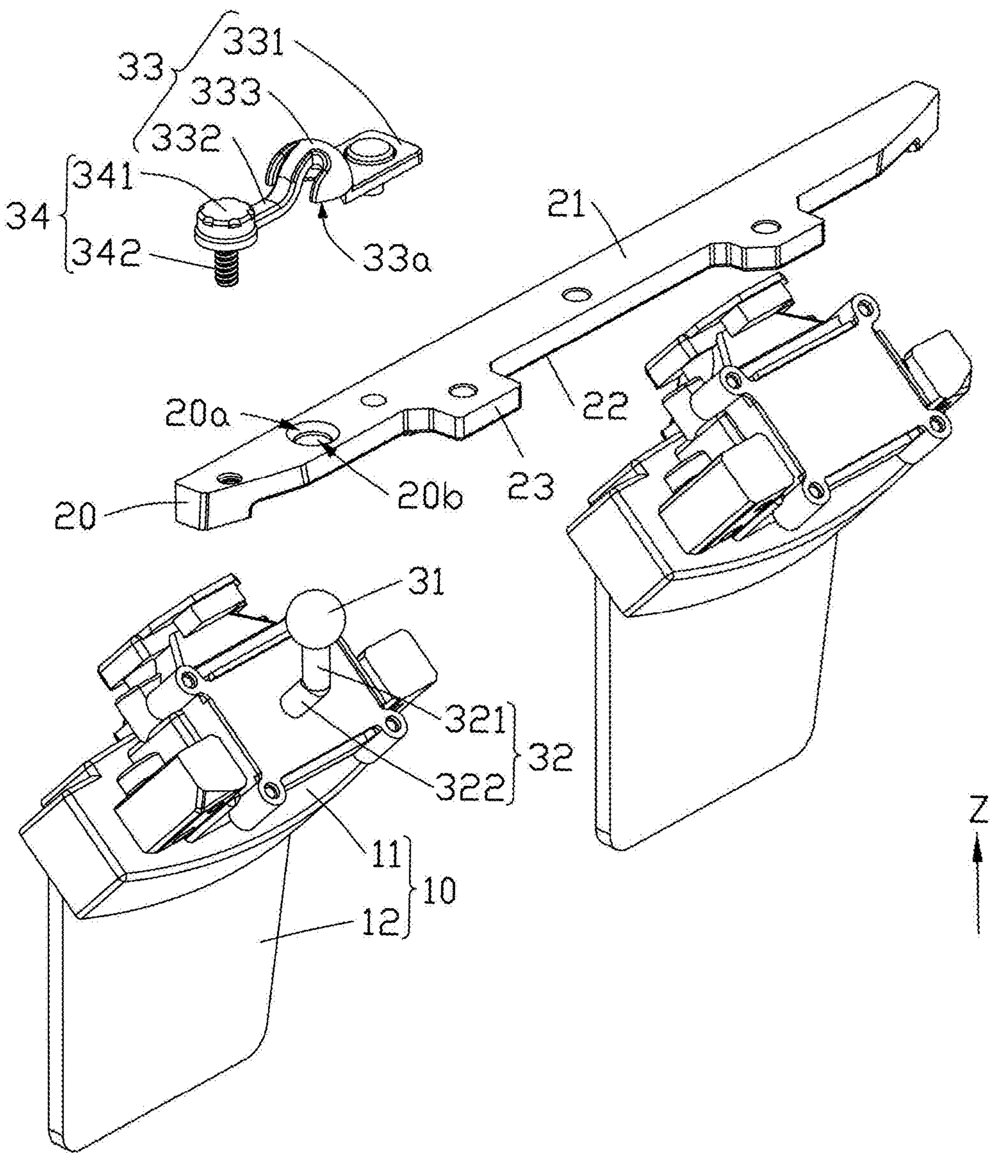
FIG. 4 is an exploded, diagrammatic view of an embodiment of a display device according to the present disclosure.

Referring to FIG. 4, in at least one embodiment, the connecting rod 32 may include a first connecting portion 321 and a second connecting portion 322. The first connecting portion 321 extends through the through hole 20*b*. One end of the first connecting portion 321 is fixedly connected to the spherical bearing 31, and the other end of the first connecting portion 321 is fixedly connected to the second connecting portion 322. The second connecting portion 322 is bent relative to the first connecting portion 321, and the end of the second connecting portion 322 away from the first connecting portion 321 is fixedly connected to the optical assembly 10, specifically connected to a side of the display member 11. The first connecting portion 321 cooperates with the second connecting portion 322 to improve the range of the adjustably positions of the optical assembly 10.

Optionally, the first connecting portion 321 may extend in a radial direction of the spherical bearing 31 to improve a stability of a stress between the first connecting portion 321 and the spherical bearing 31.

In at least one embodiment, the connecting rod 32 may be a rod extending in a straight line, or the connecting rod 32 may include three or more connecting portions connecting in sequence and relatively bent, so as to adapt to different usage scenarios.

Referring to FIG. 3 and FIG. 4, in at least one embodiment, the adjustment assembly 30 may further include a fastener 34. The cover 33 includes a fixing portion 331, an adjustment portion 332, and an elastic portion 333 fixedly connected between the fixing portion 331 and the adjustment portion 332. The elastic portion 333 corresponds to the first recess 20*a* in the first direction Z. The spherical bearing 31 is arranged between the first recess 20*a* and the elastic portion 333, and the elastic portion 333 is used to apply a pressure to the spherical bearing 31 toward the inner surface defining the first recess 20*a*. The elastic portion 333 has enough deformation to withstand a force providing enough downward force to fix the spherical bearing 31, so as to improve the stability of fixing the spherical bearing 31 in the first recess 20*a*.

The fixing portion 331 is fixedly connected to the first surface 21 of the frame 20 and the fixing portion 331 is located on a side of the first recess 20*a*. The adjustment portion 332 corresponds to the first surface 21 and the adjustment portion 332 is movably arranged on a side of the first recess 20*a* facing away from the fixing portion 331, so as to drive the elastic portion 333 to apply the pressure to the spherical bearing 31. The fastener 34 is connected between the adjustment portion 332 and the frame 20 to limit the position of the adjustment portion 332 relative to the frame 20, thereby controlling the pressure applied by the elastic portion 333 to the spherical bearing 31 through the adjustment portion 332. Specifically, when the adjustment portion 332 is close to the first surface 21, the adjustment portion 332 drives the elastic portion 333 to increase the pressure applied to the spherical bearing 31, so that the elastic portion 333 deforms and provides sufficient downward force to fix the spherical bearing 31. When the adjustment portion 332 is away from the first surface 21, the adjustment portion 332 drives the elastic portion 333 to reduce the pressure applied to the spherical bearing 31, so that the elastic portion 333 returns to the state before deformation and removes the pressure to the spherical bearing 31.

Optionally, the fixing portion 331 may be fixedly connected to the first surface 21 of the frame 20 by means of fasteners, bonding, welding, riveting and the like.

In at least one embodiment, the fixing portion 331 may be rotatably connected to the frame 20 through a hinging member, and the adjustment portion 332 can drive the elastic portion 333 to rotate to apply the pressure to the spherical bearing 31.

Referring to FIG. 3 and FIG. 4, in at least one embodiment, a side of the elastic portion 333 facing the first recess 20*a* may be provided with a second recess 33*a* recessed along the first direction Z. An inner surface defining the second recess 33*a* is used to abut against a portion of the spherical bearing 31 located outside the first recess 20*a*. The second recess 33*a* and the first recess 20*a* cooperate to clamp the spherical bearing 31, thereby improving the stability of fixing the spherical bearing 31 in the first recess 20*a* when the elastic portion 333 applies or removes the pressure to the spherical bearing 31.

In at least one embodiment, a contour of the inner surface defining the second recess 33*a* may correspond with a contour of the outer surface of the spherical bearing 31 to increase a contacting area between the inner surface defining the second recess 33*a* and the spherical bearing 31, thereby improving a stability of fixing the spherical bearing 31 in the second recess 33*a* when the elastic portion 333 applies the pressure to the spherical bearing 31, and improving a stability of rolling the spherical bearing 31 in the second recess 33*a* when the elastic portion 333 removes the pressure applied to the spherical bearing 31.

Figure 7:
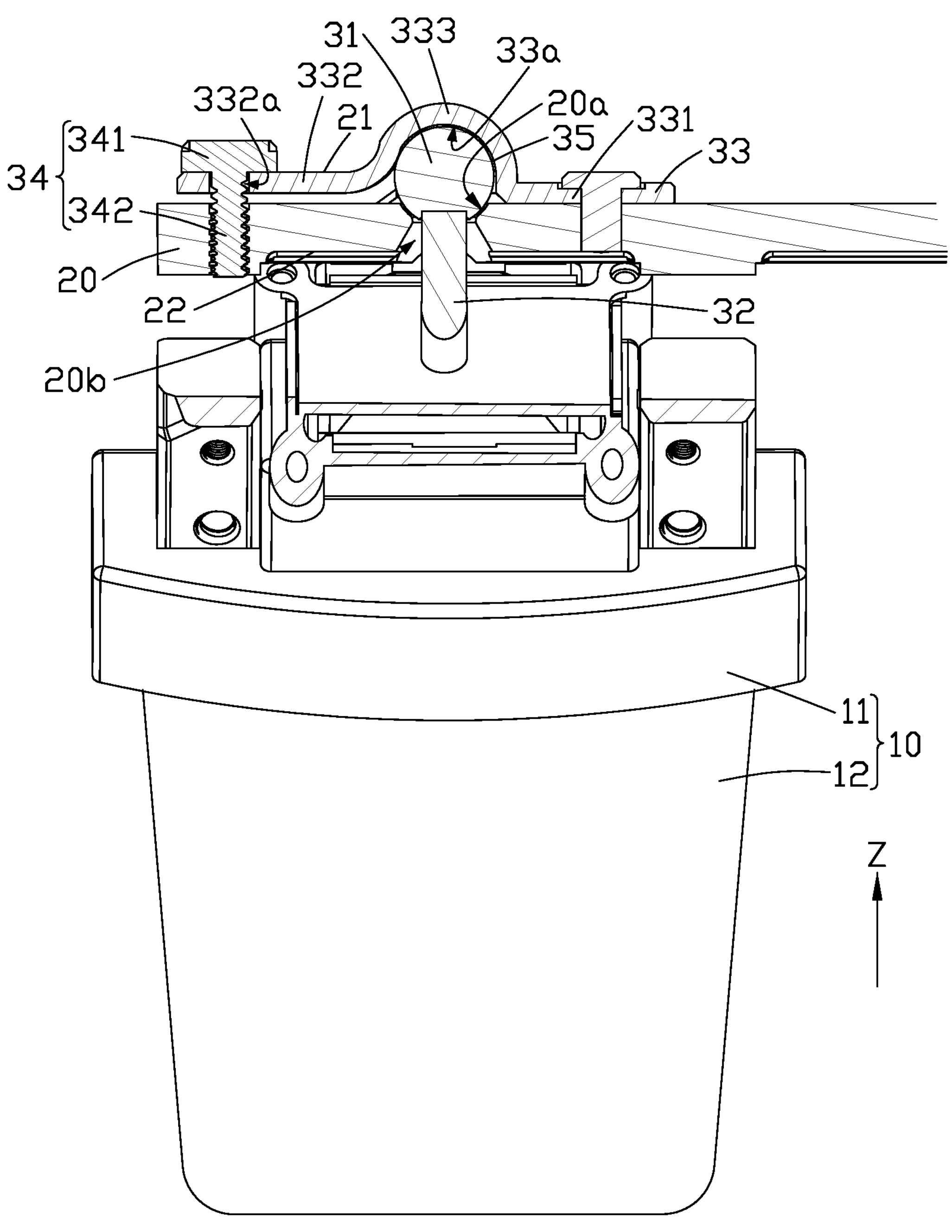
FIG. 7 is a cross-sectional view of another embodiment of the display device along B-B line of FIG. 1.

In at least one embodiment, a friction layer 35 (shown in FIG. 7) may be formed on the inner surface defining the second recess 33*a* to improve a friction between the spherical bearing 31 and the inner surface defining the second recess 33*a*, thereby improving the stability of fixing the spherical bearing 31 in the second recess 33*a* when the elastic portion 333 applies the pressure to the spherical bearing 31.

Figure 5:
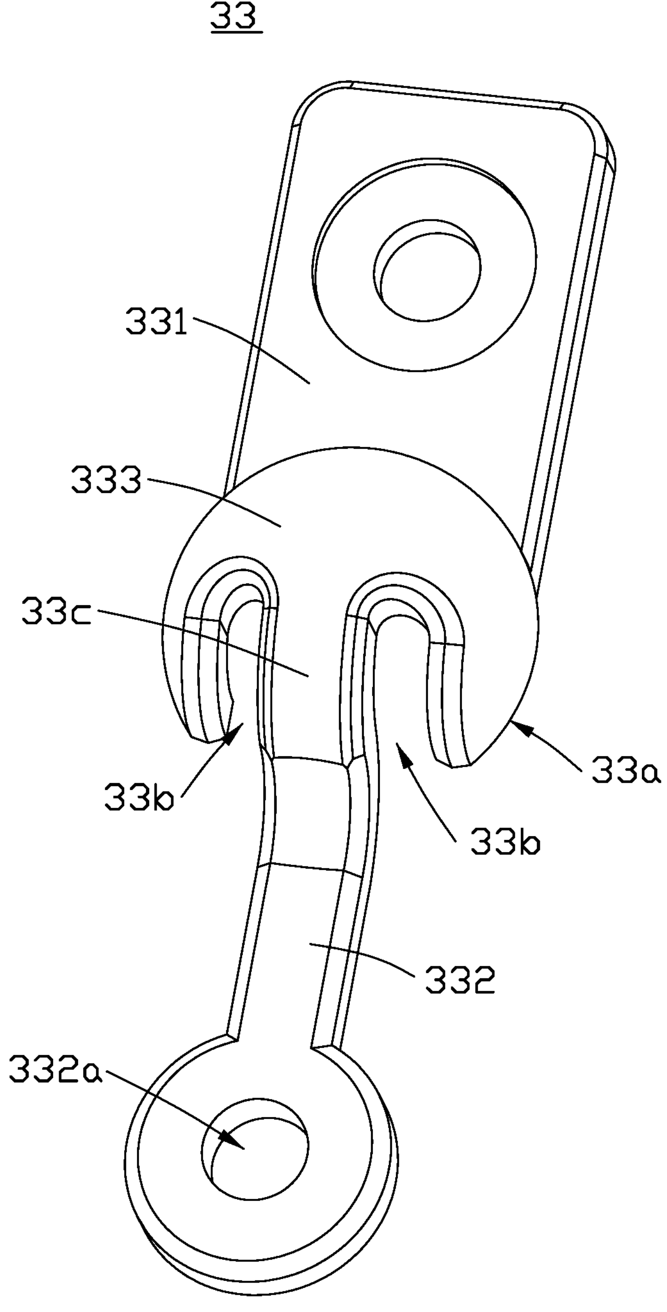
FIG. 5 is a diagram of an embodiment of a cover according to the present disclosure.

Referring to FIG. 3, FIG. 4, and FIG. 5, in at least one embodiment, the elastic portion 333 may further include two openings 33*b* communicating with the second recess 33*a*. The openings 33*b* are arranged at intervals and the elastic portion 333 includes a movable part 33*c* to separate the openings 33*a* from each other. The adjustment portion 332 is fixedly connected to the movable part 33*c*, and the adjustment portion 332 can drive the movable part 33*c* and other parts of the elastic portion 333 to apply the pressure to the spherical bearing 31. The movable part 33*c* is located between the openings 33*a*, so that the movable part 33*c* can be attached to the spherical bearing 31 to abut against the spherical bearing 31 when the elastic portion 333 applies the pressure to the spherical bearing 31, thereby improving the stability of fixing the spherical bearing 31 in the second recess 33*a*.

In at least one embodiment, the fastener 34 may include a screw head 341 and a screw rod 342 connected to the screw head 341. In a radial direction perpendicular to a second direction between the screw rod 342 and the screw head 341, a periphery of the screw head 341 protrudes from a periphery of the screw rod 342. The adjustment portion 332 includes a connecting hole 332*a*, the screw rod 342 extends through the connecting hole 332*a* and the screw rod 342 is connected to the frame 20. The adjustment portion 332 is located between the screw head 341 and the first surface 21 of the frame 20, and the screw head 341 may be abut against the adjustment portion 332. The screw rod 342 is threadedly coupled to the frame 20, and a position of the adjustment portion 332 relative to the frame 20 is restricted by rotating the screw head 341, thereby facilitating the control of the pressure applied by the elastic portion 333 to the spherical bearing 31 and improving the convenience of use.

In at least one embodiment, the cover 33 may be in a shape of a flat plate, and two sides of the cover 33 may be connected to the frame 20 through two adjustable fasteners (not labeled), so that the cover 33 may move relative to the first recess 20*a* in the first direction Z. By adjusting the adjustable fasteners, the cover 33 is rigidly abutted against an end of the spherical bearing 31 to apply the pressure to the spherical bearing 31, or the cover 33 is kept away from the spherical bearing 31 to remove the pressure to the spherical bearing 31, so that the function of adjusting and fixing the imaging angle of the optical assembly 10 can be achieved.

In at least one embodiment, two adjustment assemblies 30 may be arranged on the frame 20 and the display device 100 includes two optical assemblies 10. Each of the adjustment assemblies 30 is connected to one of the optical assemblies 10, and the optical assemblies 10 correspond to the left eye and the right eye of a human body respectively. According to the different parameters of the left eye and the right eye, the imaging angles of the optical assemblies 10 can be adjusted respectively through the adjustment assemblies 30, thereby improving the imaging quality.

Figure 8:
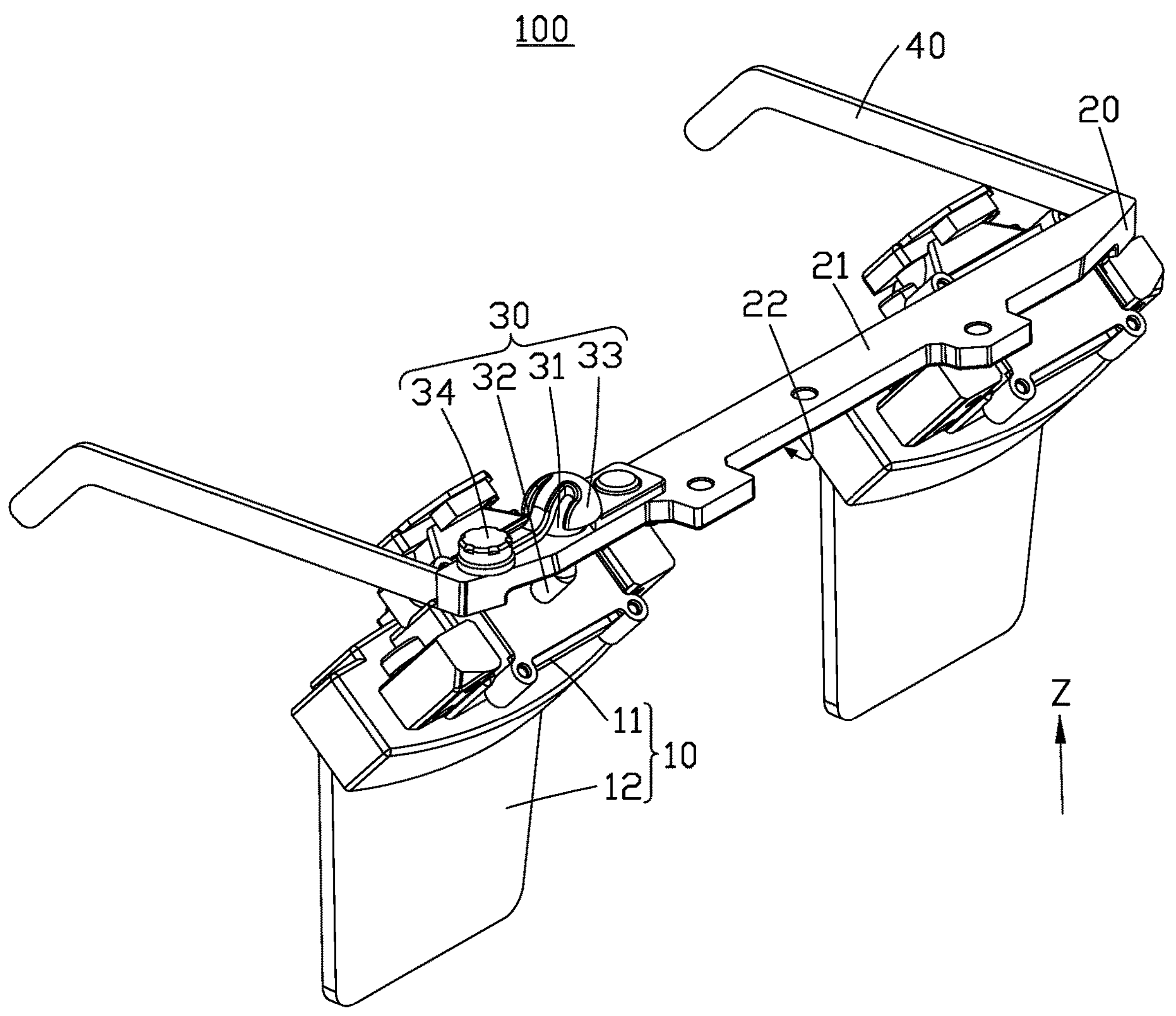
FIG. 8 is a diagram of another embodiment of a display device according to the present disclosure.

In at least one embodiment, referring to FIG. 8, the display device 100 may further include a wearing assembly 40. The wearing assembly 40 is connected to the frame 20 for wearing the display device 100 on the human body. The wearing assembly 40 may be a glasses holder, a strap or a helmet.

In the above display device 100, through the cooperation between the spherical bearing 31 and the first recess 20*a*, it is convenient for the connecting rod 32 to drive the optical assembly 10 to move in multiple directions with the center of the spherical bearing 31 as a pivot, thereby adjusting the imaging angle of the optical assembly 10 in multiple directions. The cover 33 is arranged on a side of the spherical bearing 31 facing away from the frame 20 and the cover 33 is adjustably connected to the frame 20 in the first direction Z, so that the cover 33 can be selectively apply a pressure to the spherical bearing 31. When the cover 33 applies a pressure to the spherical bearing 31, the position of the spherical bearing 31 in the first recess 20*a* is fixed, so that the imaging angle of the optical assembly 10 can be fixed through the connecting rod 32. When the cover 33 removes the pressure applied to the spherical bearing 31, the position of the spherical bearing 31 in the first recess 20*a* can be adjusted, so that the imaging angle of the optical assembly 10 can be adjusted through the connecting rod 32.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A display device comprising:

an optical assembly for displaying images;

a frame comprising a first surface, a second surface facing away from the first surface in a first direction, and a side surface connecting the first surface and the second surface; and an adjustment assembly comprising a spherical bearing, a connecting rod, and a cover;

wherein the frame and the optical assembly are arranged at intervals, a first recess is concave in the first direction from the first surface of the frame toward the second surface of the frame, a through hole penetrates the second surface of the frame and an end of the through hole communicates with the first recess in the first direction, the first recess and the through hole are spaced apart from the side surface of the frame, respectively; a friction layer is formed on an inner surface defining the first recess, a part of the spherical bearing is received in the first recess, and the spherical bearing movably abuts against the friction layer; the connecting rod extends through the through hole, one end of the connecting rod is fixed to the spherical bearing, and the other end of the connecting rod is connected to the optical assembly; the cover is arranged on a side of the spherical bearing facing away from the frame and the cover is adjustably connected to the frame in the first direction to selectively apply or remove a pressure to the spherical bearing;

wherein the adjustment assembly further comprises a fastener, the cover comprises a fixing portion, an adjustment portion, and an elastic portion fixedly connected between the fixing portion and the adjustment portion; the elastic portion corresponds to the first recess in the first direction, the spherical bearing is arranged between the first recess and the elastic portion, the fixing portion is fixedly connected to a surface of the frame and the fixing portion is located on a side of the first recess; the adjustment portion is movably arranged on a side of the first recess facing away from the fixing portion, the adjustment portion is configured to drive the elastic portion to apply the pressure to the spherical bearing; the fastener is connected between the adjustment portion and the frame to limit a position of the adjustment portion relative to the frame.

2. The display device of claim 1, wherein a side of the elastic portion facing the first recess is provided with a second recess recessed along the first direction, an inner surface defining the second recess is configured to abut against a portion of the spherical bearing located outside the first recess.

3. The display device of claim 2, wherein a contour of the inner surface defining the second recess corresponds with a contour of an outer surface of the spherical bearing.

4. The display device of claim 3, wherein the elastic portion further comprises two openings and a movable part separating the openings from each other, the adjustment portion is fixedly connected to the movable part.

5. The display device of claim 2, wherein a friction layer formed on the inner surface defining the second recess.

6. The display device of claim 1, wherein the fastener comprises a screw head and a screw rod connected to the screw head along a second direction, a periphery of the screw head protrudes from a periphery of the screw rod in a radial direction perpendicular to the second direction, the adjustment portion comprises a connecting hole, the screw rod extends through the connecting hole, the screw rod is connected to the frame, and the adjustment portion is located between the screw head and the frame.

7. The display device of claim 1, wherein the connecting rod comprises a first connecting portion and a second connecting portion, the first connecting portion extends through the through hole, one end of the first connecting portion is fixedly connected to the spherical bearing, and the other end of the first connecting portion is fixedly connected to the second connecting portion; the second connecting portion is bent relative to the first connecting portion and connected to the first connecting portion, and an end of the second connecting portion away from the first connecting portion is fixedly connected to the optical assembly.

8. The display device of claim 1, wherein a diameter of the through hole gradually increases outward from the first recess.

9. The display device of claim 1, wherein the optical assembly comprises a display member and a waveguide sheet, one side of the display member is fixedly connected to the connecting rod, and another side of the display member is fixedly connected to the waveguide sheet, the display member is configured to transmit imaging light into the waveguide sheet, the waveguide sheet is configured to display images.

10. The display device of claim 9, wherein the waveguide sheet comprises a first region and a second region, the first region is received in the display member for receiving the imaging light of the display member, the second region is located outside the display member for displaying images.

11. The display device of claim 9, wherein the waveguide sheet is a grating optical waveguide or a geometric array optical waveguide.

12. The display device of claim 1, wherein a contour of the inner surface defining the first recess corresponds with a contour of an outer surface of the spherical bearing.

13. The display device of claim 1, wherein the inner surface defining the first recess is an arc-shaped surface.

14. The display device of claim 7, wherein the first connecting portion extends in a radial direction of the spherical bearing.

15. The display device of claim 1, wherein the display device further comprises a wearing assembly connected to the frame.

16. The display device of claim 15, wherein the wearing assembly is a glasses holder, a strap, or a helmet.

* * * * *